(12) United States Patent
Yoon et al.

(10) Patent No.: US 11,698,259 B2
(45) Date of Patent: Jul. 11, 2023

(54) SYSTEM AND METHOD FOR EVACUATION BASED ON SHOOTING SOUND DETECTION

(71) Applicant: CORNERS CO., LTD., Seoul (KR)

(72) Inventors: Seung Sik Yoon, Seoul (KR); Jang Won Choi, Seoul (KR); Dong Oh Kim, Seoul (KR)

(73) Assignee: CORNERS CO., LTD., Seoul (KR)

( * ) Notice: Subject to any disclaimer, the term of this patent is extended or adjusted under 35 U.S.C. 154(b) by 202 days.

(21) Appl. No.: 16/236,755

(22) Filed: Dec. 31, 2018

(65) Prior Publication Data

US 2020/0041273 A1    Feb. 6, 2020

(30) Foreign Application Priority Data

Aug. 6, 2018    (KR) .......................... 10-2018-0091143

(51) Int. Cl.
| | | |
|---|---|---|
| G01C 21/20 | (2006.01) | |
| G08B 7/06 | (2006.01) | |
| F41H 11/00 | (2006.01) | |
| G01H 3/10 | (2006.01) | |
| G08B 13/16 | (2006.01) | |

(52) U.S. Cl.
CPC .......... *G01C 21/206* (2013.01); *F41H 11/00* (2013.01); *G01H 3/10* (2013.01); *G08B 7/066* (2013.01); *G08B 13/1609* (2013.01)

(58) Field of Classification Search
CPC .. G01C 21/206; G08B 7/066; G08B 13/1609; G08B 21/182; G08B 21/10; G08B 23/00; F41H 11/00; G01H 3/10; G01H 3/12
See application file for complete search history.

(56) References Cited

U.S. PATENT DOCUMENTS

| | | | | |
|---|---|---|---|---|
| 2017/0131105 | A1* | 5/2017 | Buscemi | G01C 21/206 |
| 2018/0067204 | A1* | 3/2018 | Frizzell | G01S 13/887 |
| 2018/0158305 | A1* | 6/2018 | Noland | G08B 15/00 |
| 2019/0295207 | A1* | 9/2019 | Day | G06Q 90/205 |

OTHER PUBLICATIONS

Optimizing Guidance for an Active Shooter Event, Gunn et al., Jun. 3, 2017, International Conference on Robotics and Automation (ICRA) (Year: 2017).*

* cited by examiner

*Primary Examiner* — Jeffrey C Boomer
(74) *Attorney, Agent, or Firm* — NSIP Law

(57) ABSTRACT

A system and method may detect one or more shooting sounds and provide guidance to one or more evacuating people when an active shooting event has occurred indoors, thereby minimizing a secondary damage. The system comprises: a plurality of stations configured to detect one or more shooting sounds and transmit detection of the one or more shooting sounds; and a response server configured to receive the detection of one or more shooting sounds over a communication network, to generate action commands, respectively corresponding to each of the stations, based on the detection of the one or more shooting sounds, and to transmit the respective action commands to the each of the corresponding stations over the communication network.

9 Claims, 9 Drawing Sheets

FIG. 8

| Shooting Arc | $t_n$ | $t_t$ | $T_m$ | Remarks |
|---|---|---|---|---|
| Aab | 72.33 | 15.22 | 57.11 | |
| Abc | 54.22 | 15.22 | 39 | |
| Acd | 33.65 | 15.22 | 18.43 | Line of Sight |
| Adm | 14.87 | 22.67 | -7.8 | Evcuation impossible, hiding |

SYSTEM AND METHOD FOR EVACUATION BASED ON SHOOTING SOUND DETECTION

CROSS-REFERENCE TO RELATED APPLICATION

This application claims the priority to Korean Patent Application No. 10-2018-0091143 filed on Aug. 6, 2018, which is incorporated herein by reference in its entirety.

TECHNICAL FIELD

Various embodiments of the present disclosure relate generally to a system and method for detecting an active shooting accident in an indoor space such as a school or the like or in an outdoor facility such as a stadium or hall and outputting or provide guidance messages to one or more evacuating persons, and more specifically to a system and method that calculates and provides an optimal evacuation route and a hiding command depending on the location of a shooter.

BACKGROUND

The Interagency Security Committee (ISC) and Federal Emergency Management Agency (FEMA) of the U.S. stipulate that actions must be taken according to "RUN" (active escape), "HIDE" (hiding), and "FIGHT" (suppression) in case of an active shooter and hostile event. However, when an active shooting incident has occurred, it is difficult for persons located within an indoor space to be aware of the current situation, and it is also difficult to deliver action guides to the persons.

It is with respect to these and other general considerations that the following embodiments have been described. Also, although relatively specific problems have been discussed, it should be understood that the embodiments should not be limited to solving the specific problems identified in the Background.

SUMMARY

According to some embodiments of the present disclosure, when an active shooting or hostile event occurs indoors, one or more persons can safely and quickly evacuate based on the location where the firearm has occurred or the location of a shooter.

According to certain embodiments of the present disclosure, a system and/or method may to provide guidance on a hiding command to one or more persons located close to a shooter or located on the line of sight of the shooter, thereby minimizing the damage of the persons.

According to an aspect of the present invention, there is provided a system for providing guidance in response to an active shooting and hostile event, the system including: a plurality of stations configured to detect shooting sounds attributable to a firearm accident having occurred in an indoor space; and a response server configured to receive results of the detection over a communication network, and to compute action commands corresponding to the respective stations based on the received results of the detection; wherein the computed action commands are transmitted to the stations corresponding to the respective action commands over the communication network, and are exposed to one or more persons located within the indoor space via the respective stations.

Each of the plurality of stations may include: a microphone configured to detect a corresponding one of the shooting sounds; and a transmission unit configured to transmit a corresponding one of the results of the detection and an identifier (ID) of the station to the response server when the intensity of the shooting sound detected using the microphone is equal to or higher than a predetermined threshold value.

The response server may include: a storage unit configured to store a structure map of the indoor space on which the locations of the station within the indoor space have been indicated; and an estimation unit configured to estimate the location where the active shooting event has occurred within the indoor space based on the identifiers (IDs) of the stations.

The response server may further include: a movement time computation unit configured to compute the movement times required to move from the location where the active shooting has occurred to the locations of the respective stations based on the location where the shooting incident has occurred, the structure map of the indoor space, and the locations of the stations within the indoor space; an escape time computation unit configured to compute the escape times required to escape from the indoor space at the locations of the respective stations; and an action command computation unit configured to compute the action commands for the respective stations based on the movement times and the escape times.

Each of the action commands may include, for example, but not limited to, at least one of a command instructing one or more persons to evacuate immediately and a command instructing one or more persons to hide from the shooter of the firearm accident depending on a corresponding one of the differences between the movement times and the escape times. The action commands can be modified according to standard action procedures defined either by the security officials of a facility, or by the authorities having jurisdiction of responses related to active shooting and hostile events.

Each of the plurality of stations may further include a millimeter wave based device or a radar device, configured to detect the location and movement of the shooter; and the movement time computation unit of the response server may update the location where the active shooting event has occurred to the location of the shooter, and may re-compute the movement times.

According to another aspect of the present invention, there is provided an active shooting event response station disposed at each of a plurality of locations within an indoor space and configured to provide guidance on an action command in response to the active shooting event, the active shooting event response station including: a microphone configured to detect a shooting sound; a transmission unit configured to transmit a result of the detection to a response server; a reception unit configured to receive an action command, computed based on the result of the detection and the location of the station within the indoor space, from the response server; an action command guidance unit configured to expose the received action command to one or more persons located within the indoor space.

The active shooting event response station may further include a comparison unit configured to compare the result of the detection with a predetermined threshold value; and the transmission unit may transmit the result of the detection and the identifier (ID) of the station to the response server when the result of the detection is equal to or higher than the predetermined threshold value. The comparison unit may take into consideration input values provided by each station, and generate valid detection based on the multiple input values received from each stations.

The active shooting event response station may further include a millimeter wave based device or radar configured to detect the shooter of the firearm accident; the transmission unit may transmit information about the location to which the shooter has moved to the response server when the shooter is detected as having moved.

The millimeter wave based device or radar may detect the shooter as having moved when a person and a metal having a predetermined size or larger within a predetermined distance has moved within the indoor space in the same identical direction.

According to still another aspect of the present invention, there is provided an active shooting event response server including: a reception unit configured to receive detection results, obtained by detecting shooting sounds, from a plurality of stations disposed within an indoor space; a storage unit configured to store a structure map of the indoor space on which the locations of the stations within the indoor space are indicated; an estimation unit configured to estimate the location where the active shooting event has occurred within the indoor space based on the received detection results and the structure map; an action command computation unit configured to compute action commands corresponding to the respective stations based on the location where the active shooting event has occurred and the locations of the respective stations within the indoor space; and a transmission unit configured to transmit the computed action commands to the stations corresponding to the computed action commands; wherein the transmitted action commands are exposed to one or more persons, located within the indoor space, via the respective stations.

The active shooting event response server may further include: a movement time computation unit configured to compute the movement times required to move from the location where the active shooting event has occurred to the locations of the respective stations based on the location where the active shooting event has occurred, the structure map of the indoor space, and the locations of the stations within the indoor space; and an escape time computation unit configured to compute the escape times required to escape from the indoor space at the locations of the respective stations; wherein the action command computation unit computes the action commands for the respective stations based on the movement times and the escape times.

The reception unit may receive information about the location to which the shooter of the active shooting event has moved from the stations when the shooter has moved; and the movement time computation unit may update the location where the active shooting event has occurred to the location of the shooter of the event, and may re-compute the movement times.

The action command computation unit may compute a command instructing one or more persons to hide from the shooter of the active shooting event for one of the stations when the location where the event has occurred and the location of the station are present on a line of sight.

Each of the action commands may include at least one of a command instructing one or more persons to evacuate immediately and a command instructing one or more persons to hide from the shooter of the active shooting event depending on a corresponding one of differences between the movement times and the escape times.

Each of the stations may transfer a predetermined action guide (for example, but not limited to, hiding or evacuation) for a predetermined time based on the time required for a shooter to move from a location where a firearm has been shot is detected. The system may store and use a shooter location-based action guide reference table so that status can be actively switched by taking into account the potential movement state of the shooter. Accordingly, even when the network is unavailable or the station cannot connect with the network, guidance on an action guide may be dynamically provided based on a detected shooting location.

According to various embodiments of the present disclosure, a system for providing guidance in an active shooting event may comprise: a plurality of stations configured to detect one or more shooting sounds and transmit detection of the one or more shooting sounds; and a response server configured to receive the detection of one or more shooting sounds over a communication network, to generate action commands, respectively corresponding to each of the stations, based on the detection of the one or more shooting sounds, and to transmit the respective action commands to the each of the corresponding stations over the communication network, wherein the each of the stations is configured to output the respective action commands corresponding to the each of the corresponding stations to provide the guidance to one or more evacuating persons. One or more of the stations comprise: a sound sensor configured to detect the one or more shooting sounds; and a transmitter configured to transmit the detection of the one or more shooting sounds and an identifier of the station to the response server when an intensity of the detected shooting sounds is equal to or higher than a predetermined threshold value. The response server comprises: memory configured to store a structure map of an indoor space and locations of the stations in the structure map of the indoor space; and a processor configured to estimate a location of an active shooting event where the active shooting event has occurred based on the identifier of the station. The processor of the response server is further configured to: compute movement times required to move from the location of the active shooting event to the each of the stations based on the estimated location of the active shooting event, the structure map of the indoor space, and locations of the stations; compute escape times required to escape from the indoor space from the each of the stations; and generate the action commands for the each of the stations based on the computed movement times and the computed escape times. Each of the action commands comprises at least one of a command instructing the one or more evacuating persons to escape from the indoor space and a command instructing the one or more evacuating persons to hide from the shooter depending on differences between the movement times and the escape times. The one or more of the stations further comprise: a detector configured to detect a current location of the shooter; and a processor configured to update the movement times based on the current location of the shooter. Each of the stations may be configured to store a safe evacuation time table comprising a set of active commands which has been pre-rendered by the response server, and to output the respective action commands according to a location of a shooter using the safe evacuation time table.

According to some exemplary embodiments of the present disclosure, an active shooting event response station may comprise: a sound sensor configured to detect one or more shooting sounds; a transmitter configured to transmit detection of the one or more shooting sounds to a response server; a receiver configured to receive an action command, generated based on the detection of the one or more shooting sounds and a location of the station, from the response server; a output device configured to output the received action command to one or more evacuating persons. The system may further comprise a processor configured to compare the detected one or more shooting sounds with a predetermined threshold value. The transmitter may be configured to transmit the detection of the one or more shooting sounds and an identifier of the station to the response server when the detected one or more shooting sounds is equal to or higher than the predetermined threshold value. The station may further comprise a detector configured to detect a current location of a shooter. The transmitter may be configured to transmit the current location of the shooter to the response server. The detector may be configured to detect movement of the shooter when a person and a metal having a predetermined size or larger within a predetermined distance from the person move in an identical direction. The station may further comprise memory configured to store response operations of the station corresponding to locations where the active shooting event has occurred and an elapse of time. The output device may be further configured to operate according to one of the response operations stored in the memory when the receiver does not receive the action command from the response server. The response operations may be pre-computed based on a time required for the shooter to move from the location where the active shooting event has occurred to the location of the station and a time required to escape from the location of the station via an exit.

According to certain exemplary embodiment of the present disclosure, an active shooting event response server may comprise: a receiver configured to receive detection of one or more shooting sounds from a plurality of stations disposed within an indoor space; memory configured to store a structure map of the indoor space and locations of the stations in the structure map of the indoor space; a processor configured to estimate a location where an active shooting event has occurred based on the received detection of the one or more shooting sound and the structure map, and to generate action commands, respectively corresponding to each of the stations based on the estimated location where the active shooting event has occurred and locations of the stations; and a transmitter configured to transmit the generated respective action commands to the each of the stations. The transmitted action commands may be outputted to one or more evacuating persons, located within the indoor space, via the stations. The processor may be further configured to: compute movement times required for a shooter to move from the location where the active shooting event has occurred to the locations of the stations based on the location where the active shooting event has occurred, the structure map of the indoor space, and the locations of the stations; and compute escape times required for the one or more evacuating persons to escape from the indoor space from the locations of the stations. The receiver may be further configured to receive information about an updated location of the shooter of the active shooting event from the stations when the shooter has moved. The processor may be further configured to update the movement times based on the updated location of the shooter. The processor may be further configured to generate a command instructing the one or more evacuating persons to hide from the shooter of the active shooting event for one of the stations when the location where the active shooting event has occurred and a location of the one of the stations are present on a line of sight. Each of the action commands may comprise at least one of a command instructing the one or more evacuating persons to escape from the indoor space and a command instructing the one or more evacuating persons to hide from the shooter depending on differences between the movement times and the escape times.

BRIEF DESCRIPTION OF THE DRAWINGS

The above and other objects, features and advantages of the present disclosure will be more clearly understood from the following detailed description taken in conjunction with the accompanying drawings, in which:

FIG. 8 shows an example of a table of movement times, escape times, and safe evacuation times according to an exemplary embodiment of the present disclosure.

DETAILED DESCRIPTION OF THE DISCLOSURE

Exemplary embodiments of the present disclosure will be described in detail below with reference to the accompanying drawings.

Figure 1:
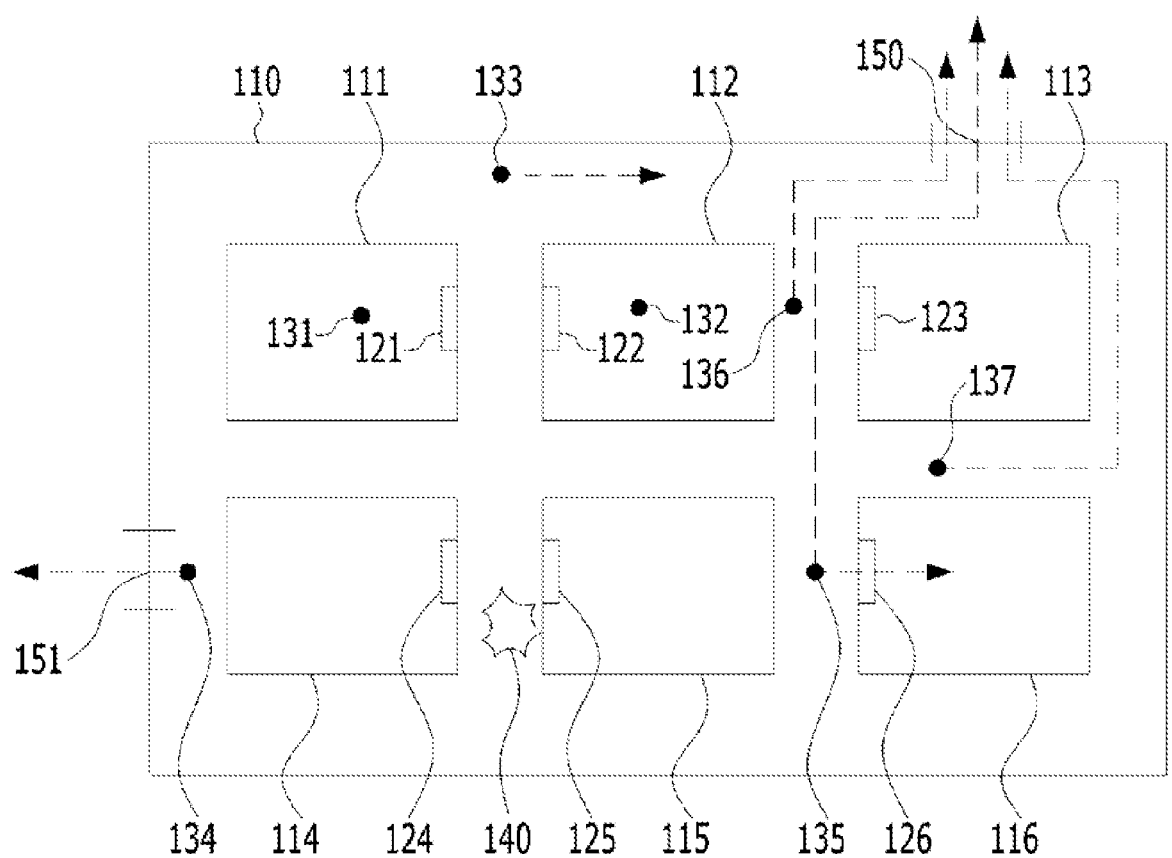
FIG. 1 shows a conceptual diagram of an example for minimizing damage by transmitting action commands to stations to notify indoor persons when an active shooting event occurs according to an exemplary embodiment of the present disclosure.

FIG. 1 shows a conceptual diagram of an example for minimizing damage by transmitting action commands to stations to indoor persons when an active shooting event occurs according to an exemplary embodiment of the present disclosure.

In FIG. 1, an indoor space 110 may be divided into a plurality of inside spaces 111, 112, 113, 114, 115 and 116 based on structures. In the indoor space 110, a plurality of persons 131, 132, 133, 134, 135, 136 and 137 may be located.

An active shooting event or firearm accident 140 may occur inside the indoor space 110. For example, the active shooting event may occur in such a manner that a shooter shoots a firearm to another person, and is generally accompanied by one or more shooting sounds.

The shooting sound may be detected by one or more detectors or sound sensors installed at various locations inside the indoor space 110, and thus the location where an active shooting event has occurred may be estimated based on the shooting sound. In this case, further casualties or another active shooting event that may be caused by the shooter may be prevented by guiding indoor persons to evacuate through optimal evacuation routes or remain inside the indoor space 110 after the occurrence of the primary shooting incident.

Some indoor or evacuating persons, such as 131 and 132, may be located close to the location where the active shooting 140 has occurred. In this case, the indoor persons 131 and 132 may hide themselves from the shooter or close doors 121 and 122. This may increase the chance of survival of the persons 131 and 132 compared to rushing to escape from the indoor space 110.

Furthermore, some indoor or evacuating persons, such as 136 and 137, may be located remote from the location where the active shooting 140 has occurred. In this case, it is safer for the indoor persons 136 and 137 to quickly escape from the indoor space 110 through a nearby entrance or exit (for example 150).

Although some indoor persons, such as 134, may be close to the location where the active shooting 140 has occurred, it may take a considerable time for the shooter to move and arrive due to an indoor structure or the like. In this case, it is safe for the occupant 134 to escape from the indoor space 110 through the closest entrance or exit (for example 151).

In contrast, although some indoor person 133 may be located remote from the location where the active shooting 140 has occurred, he or she may be located on the line of sight (LOS) of the shooter. In this case, the shooter may easily detect or find the indoor person 133, and may cause a further casualties or another active shooting event. Accordingly, guiding the indoor person 133 to the location where the indoor person 133 can move away from the line of sight and hiding himself or herself may be safer than rushing to guide the indoor person 133 through an evacuation route.

The system for providing guidance in response to an active shooting event according to the exemplary embodiment may further include one or more input devices or sound sensors such as microphones, and may estimate the location where the shot 140 has occurred by using stations disposed at various locations within the indoor space 110. The system for providing guidance in response to an active shooting event may generate a command to evaluate immediately or a command to hide from the shooter according to the structure of the indoor space 110. The generated command may be transmitted to each of the stations, and the station may output, display or expose the corresponding command to one or more indoor persons, thereby enabling the indoor persons to evacuate safely, or preventing secondary casualties from occurring.

The indoor person 135 may evacuate to the inside space 116 and close a door 126, or may evacuate via the exit 150. According to one aspect, the system for providing guidance in response to an active shooting event may track the movement of the shooter, and may select one of an evacuation command and a hiding command and provide guidance on the selected command according to the moving speed of the shooter.

Figure 2:
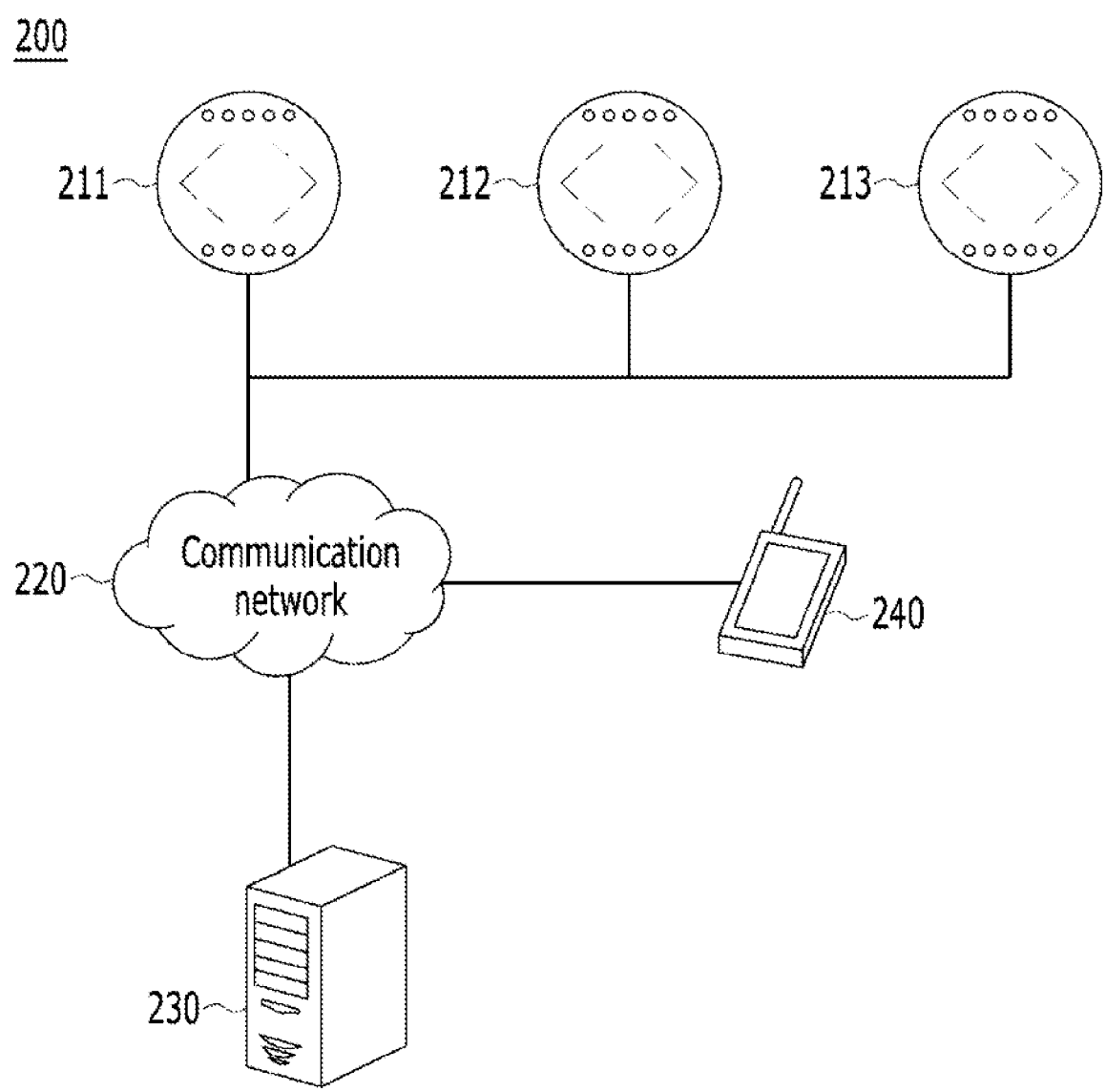
FIG. 2 is a schematic diagram of a system for providing guidance in response to an active shooting event according to an exemplary embodiment of the present disclosure.

FIG. 2 shows a schematic diagram of a system for providing guidance in response to an active shooting event according to an exemplary embodiment of the present disclosure.

A system 200 may provide guidance in response to an active shooting event. The system 200 may include a plurality of stations 211, 212 and 213, a communication network 220, an active shooting event response server 230, and at least one terminal 240.

The stations 211, 212 and 213 may be disposed at various locations in an indoor space. The station 211, 212 and 213 may include respective microphones. The stations 211, 212 and 213 may detect or sense one or more shooting sounds attributable to an active shooting event by using the microphones. The intensities of the shooting sounds detected using the microphones may differ depending on the locations of the stations 211, 212 and 213.

According to one exemplary embodiment, the stations 211, 212 and 213 may compare the intensities of the shooting sounds, detected using the microphones, with a predetermined threshold value. Each of the stations 211, 212 and 213 may transmit a detection result to the active shooting event response server 230 when the intensity of a corresponding one of the detected shooting sounds is equal to or higher than the predetermined threshold value.

Each of the stations 211, 212 and 213 may transmit the result of the detection of the corresponding shooting sound and the identifier (ID) of the corresponding station 211, 212 or 213 to the firearm accident response server 230 over the communication network 220.

According to one aspect, a low-power wireless communication network, such as a power line communication network, a LoRa network, a Zigbee network, an LTE-M network, an NB-IoT network, or the like, may be used as the communication network 220.

The active shooting event response server 230 may store a structure map of the indoor space on which the locations of the respective stations 211, 212 and 213 within the indoor space have been indicated. The active shooting event response server 230 may determine the location where the corresponding shooting sound has been detected within the indoor space based on the received ID of the corresponding station.

According to another exemplary embodiment, the stations 211, 212 and 213 may transmit the intensities of the detected shooting sounds to the active shooting event response server 230 over the communication network 220. In this exemplary embodiment, the active shooting event response server 230 may estimate the location where the shooting has occurred by using the intensities of the shooting sounds detected at the locations of the respective stations 211, 212 and 213.

The active shooting event response server 230 may generate or compute action commands corresponding to the respective stations 211, 212 and 213 based on the location where the shooting has occurred, the structure of the indoor space, and the locations of the respective stations 211, 212 and 213. For example, the firearm accident response server 230 may generate or compute a command instructing one or more indoor persons to evacuate immediately for the first station 211, and may compute a command instructing one or more indoor persons to hide from the shooter for the second station 212.

The active shooter event response server 230 may compute movement or travel times required to move from the location where the shooting has occurred to the locations of the respective stations 211, 212 and 213 based on the location where the shooting has occurred, the structure map of the indoor space, and the locations of the respective stations 211, 212 and 213.

The active shooting event response server 230 may compute escape times required for one or more evacuating people to escape from the indoor space at the locations of the respective stations 211, 212 and 213 to an exit. The active shooting event response server 230 may generate or compute action commands for the respective stations 211, 212 and 213 based on the movement times and/or the escape times.

For example, when the movement time of the shooter is longer than the escape time from the corresponding station, it may be interpreted that the time required for the shooter to move to a corresponding station is longer than the time required for one or more evacuating people to move from the corresponding station to an exit. Accordingly, the active shooting event response server 230 may generate or compute an "escape command" as an action command for the corresponding station and one or more indoor persons located near the corresponding station may escape to a safe place before the shooter reaches the corresponding station.

When the movement time of the shooter is shorter than the escape time from the corresponding station, the shooter may reach the corresponding one of the stations 211, 212 and 213 before one or more indoor persons located near the station 211, 212 or 213 reach the exit. In this case, the active shooting event response server 230 may generate or compute a command instructing one or more persons, located near the station 211, 212 or 213, to evacuate to an adjacent inside space and close a door or one of predetermined safe places which is the closest to the corresponding station.

One of the stations 211, 212 and 213 may include a movement sensor or detector, such as a radar device or a millimeter wave based device, configured to detect and track the shooter when the shooter moves. For example, the millimeter wave based device may detect objects such as a weapon, gun or knife concealed underneath a person's clothing using a form of electromagnetic radiation. The stations 211, 212 and 213 may detect or track the shooter by using, for example, but not limited to, frequency-modulated continuous-wave (FMCW) radar devices. When the shooter has moved, the stations 211, 212 and 213 may transmit information about the movement of the shooter to the active shooting event response server 230, and the active shooting event response server 230 may update the location where the shooting has occurred with the location of the shooter, re-compute the movement times of the shooter and/or the escape times from the corresponding station, and re-generate or re-compute the action commands for the respective stations 211, 212 and 213. In other words, when the shooter is moving, the active shooting event response server 230 calculate the movement times of the shooter and/or the escape times from the corresponding station and generate the action commands for the respective stations 211, 212 and 213 based on the current or updated location of the shooter instead of the location where the shooting event has occurred.

Figure 3:
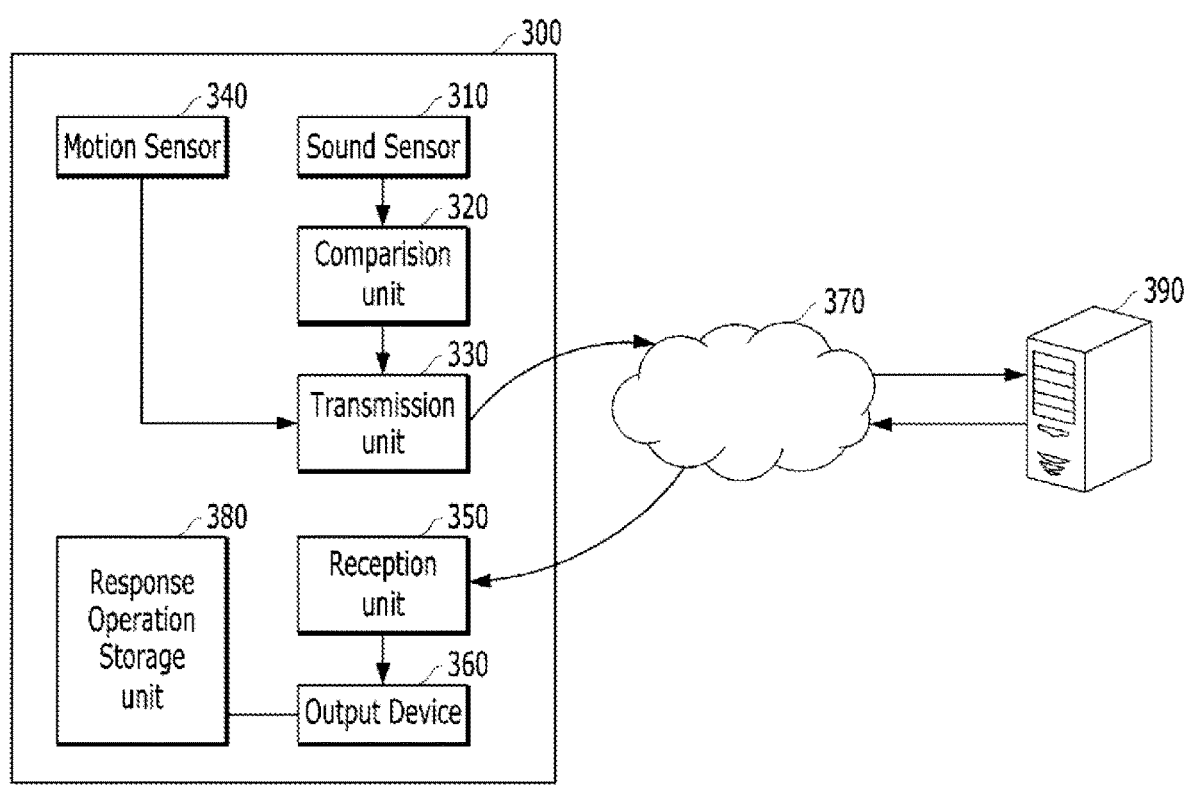
FIG. 3 shows a block diagram of a station according to an exemplary embodiment of the present disclosure.

FIG. 3 shows a block diagram of a station according to an exemplary embodiment of the present disclosure.

A station 300 may include a sound sensor (or microphone) 310, a comparison unit 320, a transmission unit or transmitter 330, a radar device 340, a reception unit or receiver 350, an action command guidance unit 360, and a response operation storage unit 380.

The plurality of stations 300 may be disposed at a plurality of locations within an indoor space, and each station 300 may be configured to output an action command to output or provide guidance to one or more indoor persons in response to an active shooting event.

The sound sensor (for example, but not limited to, microphone) 310 may be configured to detect one or more shooting sounds attributable to the active shooting event.

The comparison unit 320 may be configured to compare the intensity of the shooting sound, detected by the sound sensor 310, with a predetermined threshold value.

The transmission unit 330 may be configured to transmit the result of the detection, obtained using the sound sensor such as the microphone, to the active shooting event response server 390 over a communication network 370.

The transmission unit 330 may transmit the result of the detection of the sound sensor 310 and the ID of the station 300 to the active shooting event response server 390 over the communication network 370 when the intensity of the detected shooting sound is equal to or higher than the predetermined threshold value.

The station 300 may further include a detector 340 such as a radar device. The detector 340 may be configured to detect the shooter of the active shooting event, for example, a current location or movement of the shooter. Further, the detector 340 may be configured to detect metal having a predetermined size or larger. For example, the radar device 340 may detect a person, located within a predetermined distance from metal having a predetermined size or larger among a plurality of indoor persons located within the indoor space, as the shooter. When the detector 340 detects that the person and the metal having a predetermined size or larger move together in the same direction, the detector 340 may detect the shooter of the active shooting event as having moved or may track or sense the movement of the shooter. When the detector 340 detects the movement of the, the transmission unit 330 may transmit information about the location to which the shooter has moved to the active shooting event response server 390.

The active shooting event response server 390 may be configured to receive information related to the shooting event and/or the shooter and to generate and transmit an action command to corresponding station 300.

The reception unit or receiver 350 may be configured to receive the action command corresponding to the station 300 from the active shooting event response server 390. The action command received by the reception unit 350 may be an action command generated or computed based on the result of one or more of the detection of the shooting sound, the movement of the shooter, and the location of the station 300 within the indoor space.

The action command guidance unit or output device 360 may output or expose the received action command to one or more indoor persons within the indoor space. The action command guidance unit or output device 360 may include, for example, but not limited to, a display, a speaker, a lamp, arrows for a plurality of different directions around the station 300 or a warning indicator, or any means that can notify the action command to one or more indoor persons. When the action command is a command instructing one or more indoor persons present around the corresponding station 300 to evacuate immediately from the location of the corresponding station 300 via a specific exit, the action command guidance unit 360 may select one of the arrows indicating a direction toward the exit according to the action command. When the action command is a command instructing one or more indoor persons present around the corresponding station 300 to hide from the shooter of the active shooting event, the action command guidance unit 360 may issue a warning to the indoor persons according to the action command or provide a direction of a safe place in the indoor space. For example, in response to the warning of the action command guidance unit 360, the indoor persons may take the hiding action of entering an inside space and closing a door or entrance of the inside space, or the like.

The response operation storage unit or memory 380 may be configured to store response operations of the station corresponding to locations where active shooting events occur within the indoor space and the elapses of time. The action command guidance unit 360 may sequentially operate according to response operations stored in the response operation storage unit 380, thereby minimizing or preventing the secondary damage of the indoor persons.

The response operations stored in the response operation storage unit 380 will be described in detail with reference to FIG. 8.

Figure 4:
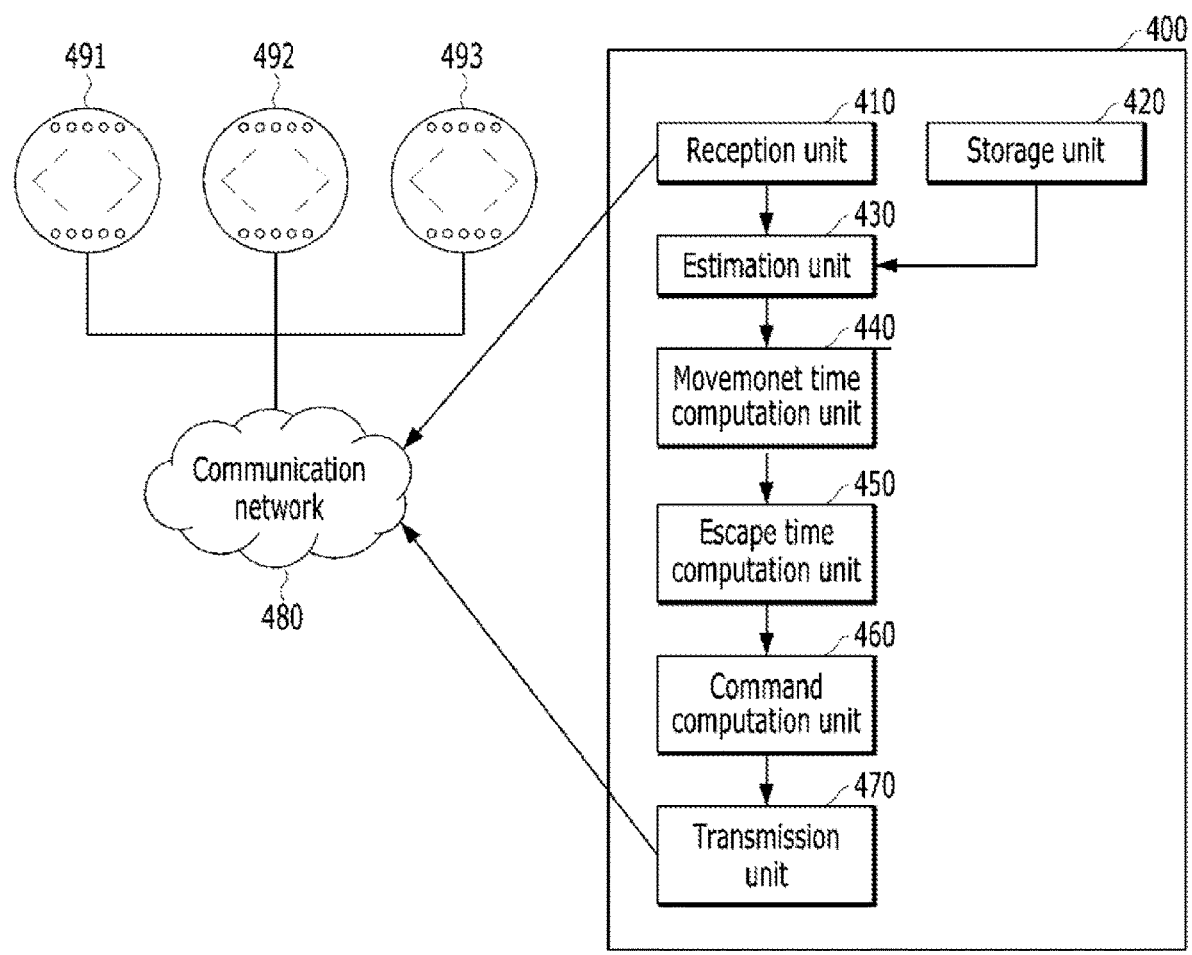
FIG. 4 shows a block diagram of an active shooting event response server according to an exemplary embodiment of the present disclosure.

FIG. 4 shows a block diagram of an active shooting event response server according to an exemplary embodiment of the present disclosure.

An active shooting event response server 400 may include, for example, but not limited to, a reception unit 410, a storage unit 420, an estimation unit 430, a movement time computation unit 440, an escape time computation unit 450, a command computation unit 460, and a transmission unit 470.

The reception unit or receiver 410 may be configured to receive the results of the detection of shooting sounds from a plurality of stations 491, 492 and 493 disposed within an indoor space. For example, the reception unit 410 may receive the result of detection only when each of the stations 491, 492 and 493 has received a shooting sound equal to or higher than a predetermined threshold value.

The storage unit or memory 420 may be configured to store a structure map of the indoor space. For example, the structure map of the indoor space may include information related to the locations of the stations 491, 492 and 493 within the indoor space.

The estimation unit 430 may be configured to estimate the location where an active shooting event has occurred within the indoor space based on information or data received from one or more of the stations 491, 492 and 493 and/or the structure map stored in the storage unit 420, for example, the results of the detection received from the stations 491, 492 and 493 and the structure map on which the locations of the stations 491, 492 and 493 have been indicated.

Figure 5A:
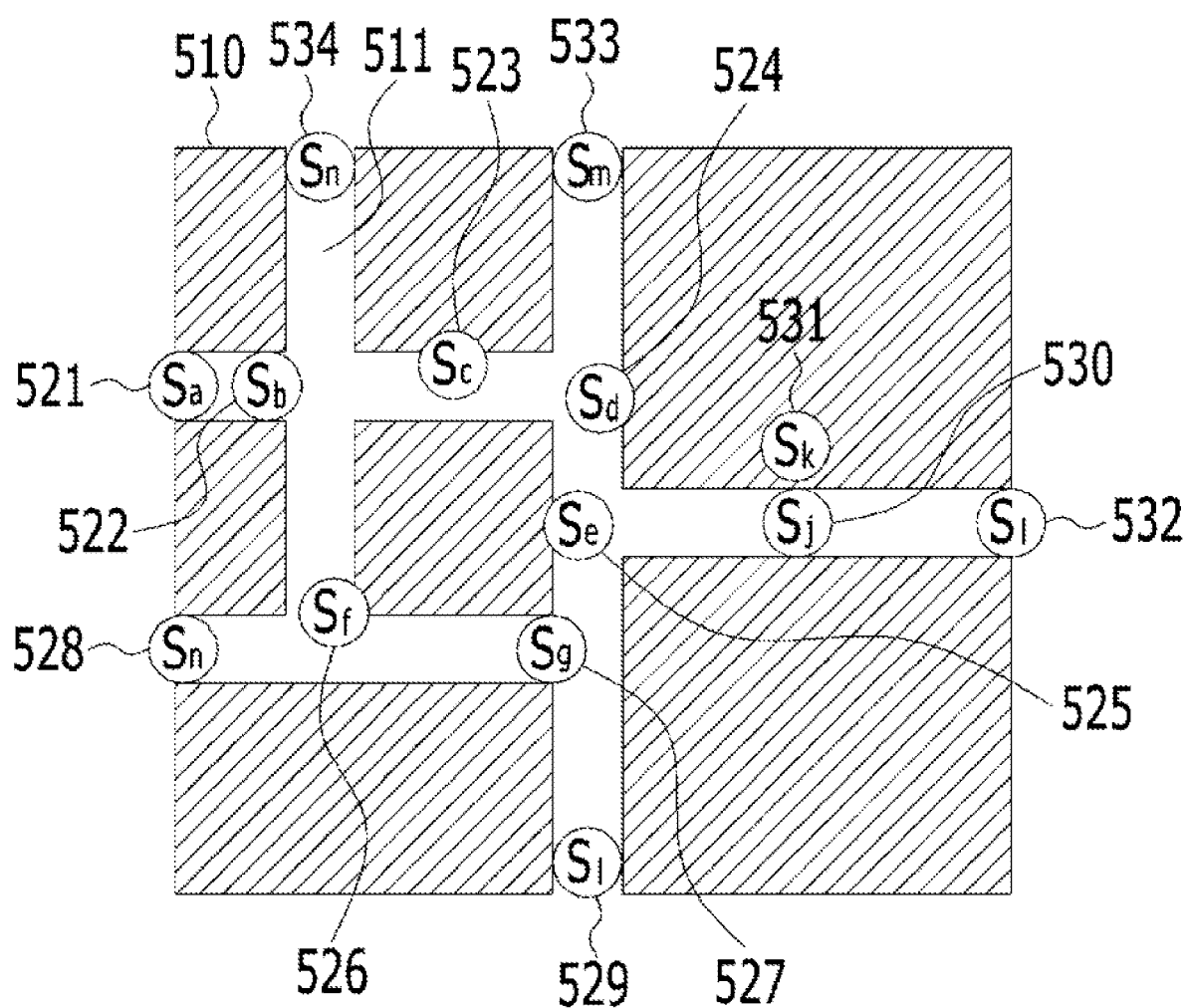
FIGS. 5A and 5B are conceptual diagrams showing an example of the modeling of evacuation routes according to an exemplary embodiment of the present disclosure.
Figure 5B:
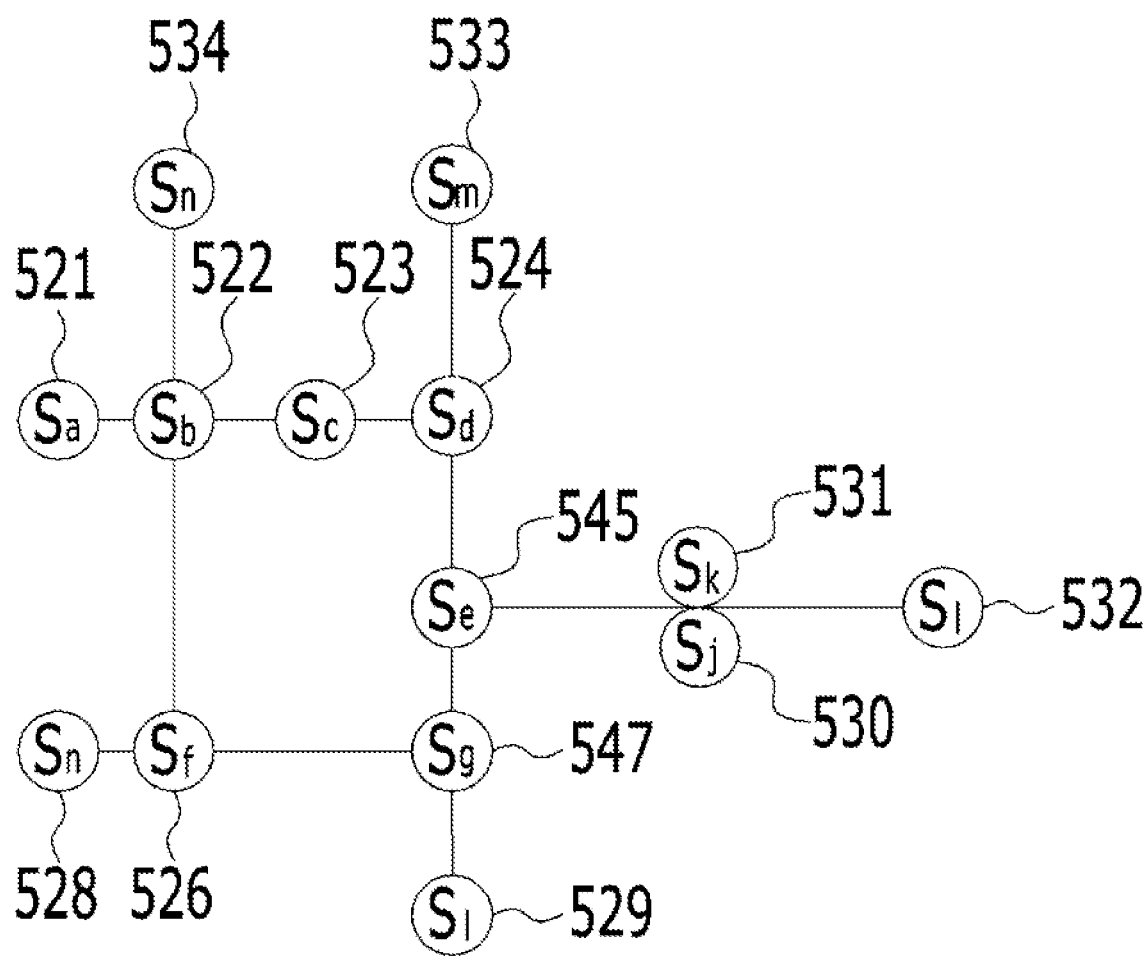
Figure 6:
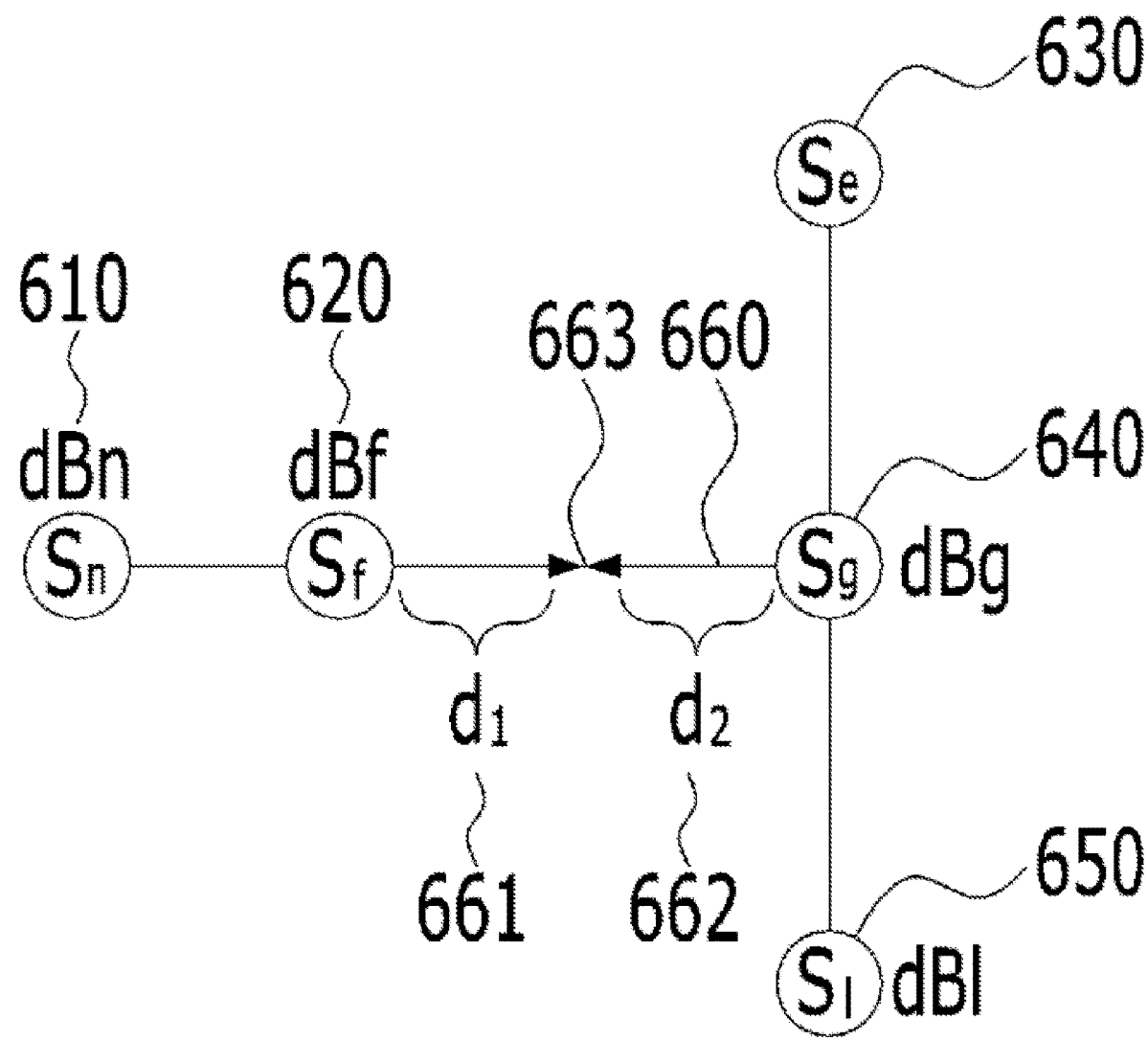
FIG. 6 is a conceptual diagram showing an example of estimation of a location where a firearm has been shot according to an exemplary embodiment of the present disclosure.

For instance, the estimation unit 430 may model evacuation routes within the indoor space, as shown in FIGS. 5A and 5B, and may estimate the location where a firearm has been shot based on the modeled evacuation routes, as shown in FIG. 6.

FIGS. 5A and 5B are conceptual diagrams showing an example of the modeling of evacuation routes according to an exemplary embodiment of the present disclosure.

An indoor space in which a system for providing guidance in response to an active shooting event according to an exemplary embodiment is installed may be divided into walls 510 and routes 511. Stations may be classified into the plurality of different types, for instance, but not limited to, 1) a hallway-type station configured to detect a shooting in a hallway and provide guidance by an action command, 2) an inside area-type station configured to detect a shooting in a closed inside area and provide guidance by an action command, or 3) an exit-type station configured to detect a shooting at an exit and provide guidance by an action command. For example, in FIG. 5A, stations 521, 528, 529, 532, 533 and 534 are exit-type stations, station 522, 523, 524, 526, and 530 are hallway-type stations, and a station 531 is an inside area-type station.

Evacuation routes may be modeled by taking into account the structure of an indoor space, for example, passageways that allow access the stations 521, 522, 523, 524, 525, 526, 527, 528, 529, 530, 531, 532, 533, and 534, etc., as shown in FIG. 5B. In FIG. 5B, the stations 521, 522, 523, 524, 525, 526, 527, 528, 529, 530, 531, 532, 533, and 534 are represented by nodes, and the passageways that allow access between the stations are represented by lines or arcs. The active shooting event response server 400 may manage the locations of the respective stations, the lengths of the passageway, the widths of the passageway, and information about stations located on a line of sight by using an evacuation route model shown in FIG. 5B.

FIG. 6 is a conceptual diagram showing an example of estimation of a location where a firearm has been shot according to an exemplary embodiment of the present disclosure.

In FIG. 6, a first station 610, a second station 620, a third station 630, and a fourth station 650 may detect shooting sounds equal to or higher than a threshold value, and may transmit the intensities of the shooting sounds (the volumes of the shooting sounds), detected by the respective stations 610, 620, 630 and 640, to the active shooting event response server, such as 230 of FIG. 2, 390 of FIG. 3, and 400 of FIG. 4.

The active shooting event response server may be configured to compute the differences between the highest volume and the remaining volumes of the received shooting sounds, and estimate or place the location of a shooter on an arc or line between nodes of the stations having the smallest difference. For example, when the volume of a shooting sound detected by the second station 620 is the highest and the volume of a shooting sound detected by the third station 630 is the second or next highest, the location of the shooter may be present on an arc or line 660 that connects the second station 620 and the third station 630 with each other.

The location of the shooter or a location 663 where a firearm accident has occurred on the corresponding arc 660 may be estimated by using Equation (1) below:

$$\log(d_1) = \log(d_2) - \frac{(dB_f - dB_g)}{20} \qquad (1)$$

where $d_1$ is the distance from the second station 620 to the location 663 where the firearm accident has occurred, $d_2$ is the distance from the third station 630 to the location 663 where the firearm accident has occurred, $dB_f$ is the volume of the shooting sound detected by the second station 620, and $dB_g$ is the volume of the shooting sound detected by the third station 630.

The movement time computation unit 440 may be configured to compute movement or travel times required to move from the location where the active shooting event has occurred to the locations of the respective stations 491, 492 and 493 based on the location where the event has occurred within the indoor space, the structure map of the indoor space, and the locations of the stations 491, 492 and 493. These movement times may be considered to be the times required for the shooter to move from the location where the active shooting event has occurred to the respective stations 491, 492 and 493.

The escape time computation unit 450 may be configured to compute the escape times required for evacuating people to escape from the indoor space at the locations of the respective stations 491, 492 and 493 via one of exits.

The command computation unit 460 may be configured to generate or compute action commands for the respective stations 491, 492 and 493 based on the movement times calculated by the movement time computation unit 440 and/or the escape times calculated by the escape time computation unit 450. Each of the action commands may include at least one of a command instructing one or more indoor persons to evacuate immediately and a command instructing one or more indoor persons to hide from the shooter of the active shooting event depending on the difference between the movement time and the escape time computed for a corresponding one of the stations 491, 492 and 493.

Each of the stations 491, 492 and 493 may include at least one detector (e.g. a radar device) configured to track the shooter or detect or sense the movement of the shooter. When the detectors of the stations 491, 492 and 493 detects the movement of the shooter after the occurrence of the active shooting event, the stations 491, 492 and 493 may transmit new or updated location of the shooter to the active shooting event response server 400. The reception unit 410 may receive information about the location, to which the shooter of the event has moved, from at least one of the stations 491, 492 and 493, and the movement time computation unit 440 may update or re-calculate movement times by using the updated location of the shooter instead of the location where the active shooting has occurred. The command computation unit 460 may update the action commands for respective stations 491, 492 and 493 by using the updated location of the shooter.

The action command computation unit 460 may be configured to generate or compute a command instructing one or more indoor persons to hide from the shooter of the active shooting event for each of the station 491, 492 or 493 when the location of the shooting and the location of the station 491, 492 or 493 are present on a line of sight. It is important that one or more indoor persons move away from the area or field of view of the shooter because, when the station is present on a line of sight from the location where the active shooting has occurred or the location of the shooter, a secondary accident may occur using a firearm regardless of the distance from the shooter.

The transmission unit or transmitter 470 may be configured to transmit the action commands, computed for the respective stations 491, 492 and 493, to the corresponding stations 491, 492 and 493. The action commands transmitted to the respective stations 491, 492 and 493 be outputted, displayed or exposed to one or more indoor persons located within the indoor space via the respective stations 491, 492 and 493, thereby preventing additional casualties and also enabling indoor persons to evacuate safely and quickly.

Figure 7:
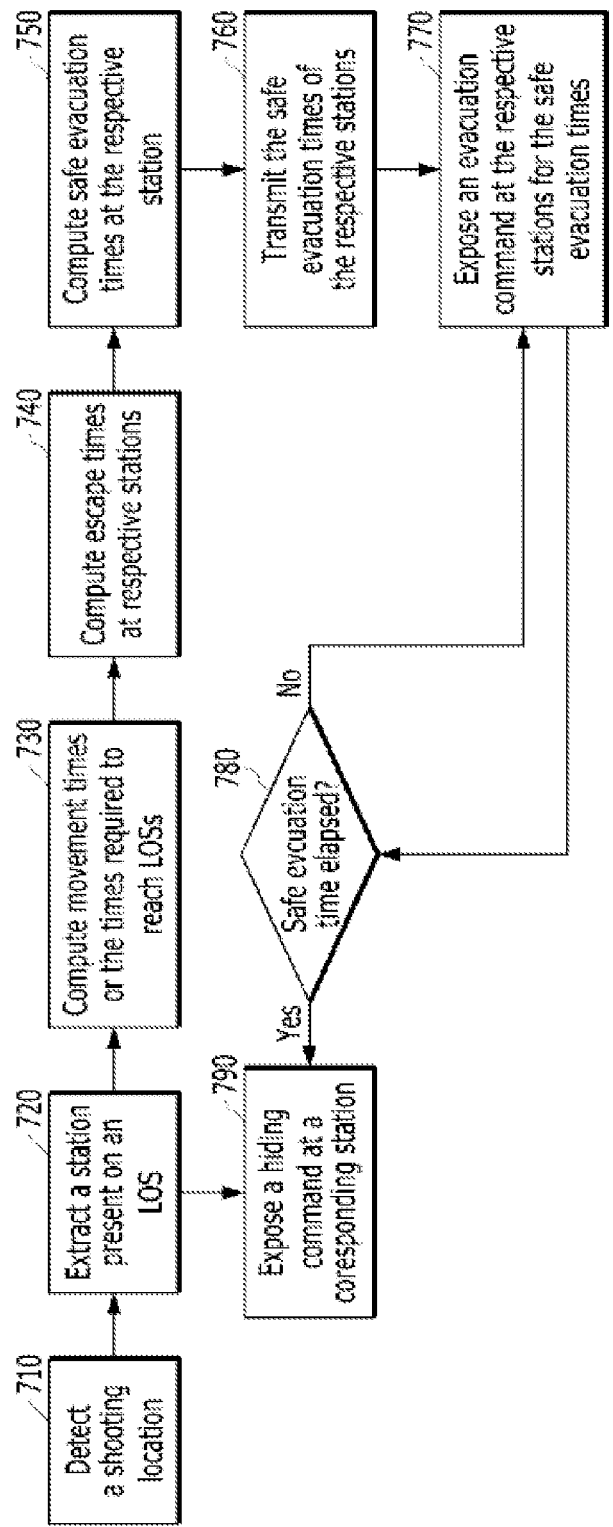
FIG. 7 shows a flowchart of a method of switching the status of stations according to an exemplary embodiment of the present disclosure.

FIG. 7 shows a flowchart of a method of switching the status of the stations according to an exemplary embodiment of the present disclosure.

The stations and/or the active shooting event response server may estimate the location of a shooter by communicating information over the communication network, and/or generate or compute action commands for the respective stations. However, when an active shooting event occurs, the communication network may not operate normally. Furthermore, the communication latency of the stations may affect accurate responses due to delay in network response time. In these cases, each of the stations may utilize the safe evacuation time table that has been pre-rendered from the active shooting event response server, based on the location of the active shooter. The safe evacuation time table is a set of commands that a station should take, according to the location of the shooting. The stations may safely evacuate adjacent indoor persons while switching status in a predetermined sequence, as shown in FIG. 7.

At step 710, the stations may detect one or more shooting sounds, and the active shooting event response server may estimate or determine the location where the shooting has occurred or a shooting location by using the detected shooting sounds.

At step 720, the active shooting event response server may estimate or extract one or more stations, located on a line of sight (LOS) from the location where the shooting event has occurred, the shooting location, or the location of a shooter, from the stations located within an indoor space.

A command (i.e. a hiding command) instructing one or more indoor persons to hide from the shooter may be generated or computed for the station located on the line of sight by the active shooting event response server, and the hiding command may be outputted, displayed, or exposed via the station located on the line of sight at step 790.

For stations not located on the line of sight, the times required for the shooter to reach the respective stations or the times required for the shooter to reach lines of sight when the shooter moves (movement times) are computed at step 730 by the active shooting event response server.

At step 740, times (i.e. escape times) required for evacuating people to move from the respective stations to one of exits are computed by the active shooting event response server.

At step 750, safe evacuation times are computed for the respective stations by the active shooting event response server. The safe evacuation times may be computed, as shown in Equation (2) below:

$$T_n = t_n - t_t \qquad (2)$$

where $T_n$ is the safe evacuation time, $t_n$ is the movement time, and q is the escape time.

The safe evacuation time $T_n$ is the time for which each of the stations can output or expose a command instructing one or more indoor persons to evacuate safely and immediately.

At step 760, the active shooting event response server transmits the safe evacuation times $T_n$, computed for the respective stations, to the respective stations.

At step 770, each of the stations outputs or exposes the command instructing one or more indoor persons to evacuate immediately for the corresponding safe evacuation time $T_n$.

At step 780, the station determines whether the safe evacuation time $T_n$ has elapsed.

When the safe evacuation time $T_n$ has not elapsed, the station continuously re-exposes the command instructing one or more indoor persons to evacuate immediately at step 770.

When the safe evacuation time $T_n$ has elapsed, the station may output or expose another command instructing one or more indoor persons to hide at a safe place at step 790.

FIG. 8 shows an example of a table of movement times, escape times, and safe evacuation times for each station according to an exemplary embodiment of the present disclosure.

Each station may have a table uniquely or independently determined based on the location of each station. The table may store the locations where active shooting events occur within an indoor space and response operations of the station based on the elapses of time. When the communication with the active shooting event response server is cut off or unavailable or when the station cannot communicate with the active shooting event response server, the station responds according to time by extracting information from the stored table or referring to the stored table, thereby safely evacuating one or more indoor persons.

Each station may include information about safe evacuation times computed based on locations where active shooting events occur or locations of shooters and this information may be pre-stored in advance. When the active shooting event response server transmits information about the location where a shooting event has occurred to the station or transmits only the updated location of a shooter to the station, the station may safely evacuate one or more evacuating persons without receiving an additional control signal from the active shooting event response server.

The second row of FIG. 8 shows an exemplary case where the location where an active shooting event has occurred is present between station A and station B. In this case, the movement time $t_n$ is 72.33 seconds, the escape time $t_r$ is 15.22 seconds, and the safe evacuation time $T_n$ is 57.11 seconds. The movement time $t_n$ may be computed by taking into account the distance between the location where the active shooting event has occurred and the location of the station, and the approximate speed at which a shooter can move. The distance between the location where the active shooting event has occurred and the location of the station may be the rectilinear distance therebetween, or may be the distance of a route that is used by the shooter to move based on the structure of an indoor space. Furthermore, the escape time $t_r$ is the time required for one or more indoor persons to escape from the location of the corresponding station via an exit, and may be computed by taking into account the distance between the corresponding station and the exit and the approximate speed at which the indoor persons can move. The distance between the corresponding station and the exit may be the rectilinear distance therebetween, or may be the distance of a route that is used by the indoor persons to move based on the structure of the indoor space.

Accordingly, when an active shooting event has occurred between the station A and the station B, the station corresponding to the table shown in FIG. 8 may output or expose an evacuation command for 57.11 seconds, and may output or expose a hiding command thereafter.

The third row of FIG. 8 shows an exemplary case where the location where an active shooting event has occurred is present between station B and station C. In this case, the movement time $t_n$ is 54.22 seconds, the escape time $t_r$ is 15.22 seconds, and the safe evacuation time $T_n$ is 39 seconds. Accordingly, when the shooting event has occurred between the station B and the station C, the station corresponding to the table shown in FIG. 8 may output or expose an evacuation command for 39 seconds, and may output or expose a hiding command thereafter.

The fourth row of FIG. 8 shows an exemplary case where the location where an active shooting event has occurred is present between station C and station D. In this case, the movement time $t_n$ is 33.65 seconds, the escape time $t_r$ is 15.22 seconds, and the safe evacuation time $T_n$ is 18.43 seconds. However, when an active shooting event has occurred between the station C and the station D, the station corresponding to the table shown in FIG. 8 is located on a line of sight from the location where the shooting event has occurred, and thus the station corresponding to the table shown in FIG. 8 may output or expose a hiding command immediately from the detection of the shooting event.

The fifth row of FIG. 8 shows an exemplary case where the location where an active shooting event has occurred is present between station D and station M. In this case, the movement time $t_n$ is 14.87 seconds, the escape time $t_r$ is 22.67 seconds, and the safe evacuation time $T_n$ is −7.8 seconds. Since the safe evacuation time $T_n$ has a minus value, the time required for a shooter to reach a corresponding location of the station may be shorter than the time required for one or more indoor persons to escape. Accordingly, the station corresponding to the table shown in FIG. 8 may output or expose a hiding command immediately from the detection of the shooting event.

By using a table, such as the table shown in FIG. 8, even when there is no active shooting event response server, or even when communication with the active shooting event response server is cut off or unavailable, each of the stations may provide guidance on an appropriate action to indoor persons located adjacent to the stations by using the table independently or uniquely determined for the corresponding specific station, thereby safely evacuating one or more indoor persons or inducing one or more indoor persons to hide, with the result that a secondary casualties may be prevented from being caused by the shooter.

According to some exemplary embodiments, when an active shooting event occurs in an indoor space or outdoor facilities, one or more evacuating persons can be safely evacuated from the location where the shooting event has occurred by using the location of a shooter.

According to certain exemplary embodiments, guidance on a hiding command can be provided to one or more evacuating persons located close to the shooter or located on the line of sight of the shooter, thereby minimizing the damage of the evacuating persons.

A "unit" may refer to a hardware based unit, software based unit or a combination of hardware and software. Embodiments of hardware based units may include self-contained components such as one or more processors, chipsets, specialized circuitry and one or more memory devices, while a software-based module may be part of a program code or linked to the program code containing specific programed instructions, which may be loaded in memory.

The method according to the embodiment may be implemented in the form of program instructions which can be executed by a variety of computer means, and may be stored in a computer-readable storage medium. The computer-readable storage medium may include program instructions, a data file, and a data structure solely or in combination. The program instructions which are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code which is constructed by a compiler but also high-level language code which can be executed by a computer using an interpreter or the like. The above-described hardware components may be configured to act as one or more software modules which perform the operation of the present invention, and vice versa.

Although the embodiments have been described in conjunction with the limited embodiments and drawings, those skilled in the art may make various modifications and alterations from the above description. For example, appropriate results may be achieved even when the described techniques are performed in a different order than the described methods, and/or the components of the described systems, structures, devices, circuits, and the like are coupled or combined in a different form than the described methods, or changed to or replaced with other components or equivalents.

Therefore, other implementations, other embodiments, and equivalents to the appended claims also fall within the scope of the following claims.

What is claimed is:

1. A system for providing guidance in an active shooting event, the system comprising:

shooting sound response stations configured to detect one or more shooting sounds and transmit detection of the one or more shooting sounds; and an active shooting event response server configured to receive the detection of one or more shooting sounds over a communication network, to generate action commands, respectively corresponding to each of the shooting sound response stations, based on the detection of the one or more shooting sounds, and to transmit the respective action commands to the each of the corresponding shooting sound response stations over the communication network, wherein one or more of the shooting sound response stations comprise:

a sound sensor configured to detect the one or more shooting sounds; and a transmitter configured to transmit the detection of the one or more shooting sounds and an identifier of the shooting sound response station to the active shooting event response server when an intensity of the detected shooting sounds is equal to or higher than a predetermined threshold value, wherein the active shooting event response server comprises:

memory configured to store a map detailing physical structures dividing an indoor space and locations of the shooting sound response stations in the map detailing physical structures dividing the indoor space; and a processor configured to estimate an active shooting event location where the active shooting event has occurred based on the identifier of the shooting sound response station, wherein the processor of the active shooting event response server is further configured to:

compute movement times required to move from the active shooting event location to the each of the shooting sound response stations based on an estimated active shooting event location, the map detailing physical structures dividing the indoor space, and locations of the shooting sound response stations;

compute escape times required to escape from the indoor space from the each of the shooting sound response stations; and generate the action command for the each of the shooting sound response stations based on the computed movement time and the computed escape time corresponding to that response station, and wherein the each of the shooting sound response stations is configured to display the respective action command to provide the guidance to one or more evacuating persons, wherein the action command instructs the one or more evacuating persons to escape from the indoor space when the movement time of the shooter is longer than the escape time from the corresponding station, wherein the action command instructs the one or more evacuating persons to hide from the shooter when the movement time of the shooter is shorter than the escape time from the corresponding station, and wherein the one or more of the shooting sound response stations further comprise:

a second sensor configured to detect a current location of the shooter; and a processor configured to update the movement time required to move from the active shooting event location to the shooting response station based on the current location of the shooter.

2. The system of claim 1, wherein the each of the shooting sound response stations is configured to store a safe evacuation time table comprising a set of commands which has been pre-rendered by the active shooting event response server, and to display the respective action commands according to a location of a shooter using the safe evacuation time table.

3. An active shooting sound response station, comprising:

a sound sensor configured to detect one or more shooting sounds;

a transmitter configured to transmit detection of the one or more shooting sounds to an active shooting event response server;

a receiver configured to receive an action command, generated based on the detection of the one or more shooting sounds and a location of the shooting sound response station, from the active shooting event response server;

an action command display device configured to display the received action command to one or more evacuating persons; and a processor, wherein the action command is generated based on a computed movement time required to move from the active shooting event location to the shooting sound response station based on an estimated active shooting event location, the map detailing physical structures dividing an indoor space, and locations of the shooting sound response stations and computed escape time required to escape from the indoor space from the shooting sound response station, and wherein the computed movement time and the escape time are computed by the active shooting event response server based on the detection of the one or more shooting sounds, wherein the action command instructs the one or more evacuating persons to escape from the indoor space when the movement time of the shooter is longer than the escape time from the corresponding station, wherein the action command instructs the one or more evacuating persons to hide from the shooter when the movement time of the shooter is shorter than the escape time from the corresponding station, and wherein the sound sensor is configured to detect a current location of the shooter, and the processor is configured to update the movement time required to move from the active shooting event location to the shooting sound response station based on the current location of the shooter.

4. The active shooting sound response station of claim 3, wherein the processor is configured to compare the detected one or more shooting sounds with a predetermined threshold value, and wherein the transmitter is configured to transmit the detection of the one or more shooting sounds and an identifier of the shooting sound response station to the active shooting event response server when the detected one or more shooting sounds is equal to or higher than the predetermined threshold value.

5. The active shooting sound response station of claim 3, wherein the transmitter is configured to transmit the current location of the shooter to the active shooting event response server.

6. The active shooting sound response station of claim 3, further comprising memory configured to store response operations of the shooting sound response station corresponding to locations where the accident active shooting event has occurred and an elapse of time, and
  wherein the action command display device is further configured to operate according to one of the response operations stored in the memory when the receiver does not receive the action command from the active shooting event response server.

7. The active shooting sound response station of claim 6, wherein the response operations are pre-computed based on a time required for the shooter to move from the location where the active shooting event has occurred to the location of the shooting sound response station and a time required to escape from the location of the shooting sound response station via an exit.

8. An active shooting event response server comprising:
  a receiver configured to receive detection of one or more shooting sounds from shooting sound response stations disposed within an indoor space;
  memory configured to store a map detailing physical structures dividing an indoor space and locations of the shooting sound response stations in the map detailing physical structures dividing the indoor space;
  a processor configured to estimate a location where an active shooting event has occurred based on the received detection of the one or more shooting sounds and the map detailing physical structures dividing the indoor space, and to generate action commands, respectively corresponding to each of the shooting sound response stations based on the estimated location where the active shooting event has occurred and locations of the shooting sound response stations; and
  a transmitter configured to transmit the generated respective action commands to the each of the shooting sound response stations,
  wherein the transmitted action commands are displayed to one or more evacuating persons, located within the indoor space, via the shooting sound response stations,
  wherein the processor is further configured to:
  compute movement times required for a shooter to move from the location where the active shooting event has occurred to the locations of the shooting sound response stations based on the location where the active shooting event has occurred, the map detailing physical structures dividing the indoor space, and the locations of the shooting sound response stations; and
  compute escape times required for the one or more evacuating persons to escape from the indoor space from the locations of the shooting sound response stations,
  wherein the action command instructs the one or more evacuating persons to escape from the indoor space when the movement time of the shooter is longer than the escape time from the corresponding station,
  wherein the action command instructs the one or more evacuating persons to hide from the shooter when the movement time of the shooter is shorter than the escape time from the corresponding station, and
  wherein:
  the receiver is further configured to receive information about an updated location of the shooter from the shooting sound response stations when the shooter has moved; and
  the processor is further configured to update the movement times based on the updated location of the shooter.

9. The active shooting event response server of claim 8, wherein the processor is further configured to generate a command instructing the one or more evacuating persons to hide from the shooter for one of the shooting sound response stations when the location where the active shooting event has occurred and a location of the one of the shooting sound response stations are present on a line of sight.

* * * * *